Feb. 19, 1957 V. J. HOLOPAINEN 2,781,927
STABILIZING APPARATUS
Filed June 21, 1954

INVENTOR.
Vaino J. Holopainen
BY
Norman S. Blodgett
Attorney 2,781,927

Patented Feb. 19, 1957

2,781,927

STABILIZING APPARATUS

Vaino J. Holopainen, Rutland, Mass., assignor to Wain-Roy Corporation, Hubbardston, Mass., a corporation of Massachusetts Application June 21, 1954, Serial No. 437,958

2 Claims. (Cl. 214—138)

This invention relates to a stabilizing apparatus and more particularly to apparatus for use with a tractor having a digging attachment.

In my Patent No. 2,698,697 issued January 4, 1955, I disclosed a novel hydraulic digging attachment to be used with a tractor. Although this apparatus gives excellent service under most circumstances, there are some drawbacks which I have overcome with the present invention. In accordance with the invention disclosed in the above-mentioned patent, the digging attachment is attached to the rear of the tractor and a stabilizer is provided behind the rear axle. This stabilizer contacts the ground and acts as a fulcrum about which the weight of the attachment and the tractor are balanced during certain portions of the digging cycle. During other portions of the digging cycle, the weight is supported at one end on the shovel and at the other end on the front wheels of the tractor; during this last situation, there is very little weight on the stabilizer and it does not operate as efficiently as might be desired to prevent horizontal forces on the shovel during a "crowding" operation from pulling the tractor toward the excavation. Furthermore, the pressure on the shovel is not always as great as could be desired. The present invention obviates this difficulty in a novel manner.

It is therefore an outstanding object of the present invention to provide an improved stabilizing apparatus for a vehicle having a digging attachment.

Another object of the invention is the provision of apparatus for use on a tractor and digging attachment that will prevent the tractor from being pulled toward the excavation on a "crowding" operation.

It is a still further object of the instant invention to provide a hydraulically-operated anchoring or stabilizing apparatus for use with vehicles.

Another object of the invention is the provision of means for use with a tractor and digging attachment for increasing the digging pressure on the shovel.

Figure 1:
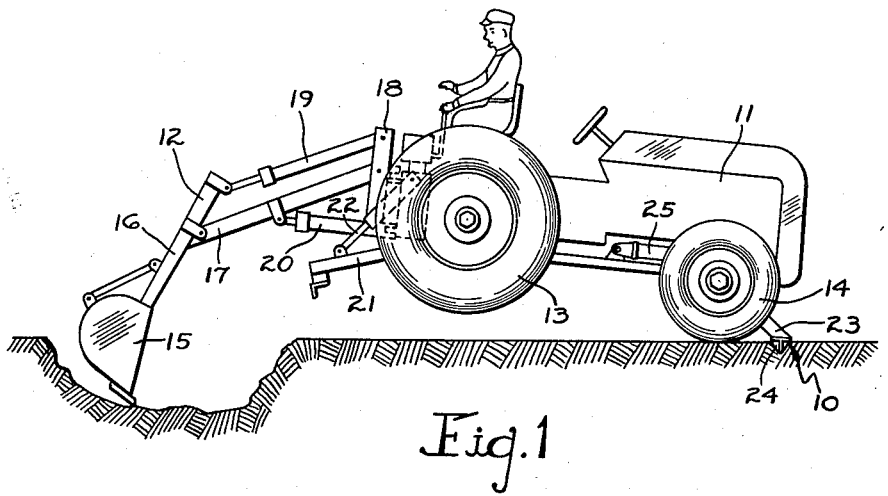
Figure 2:
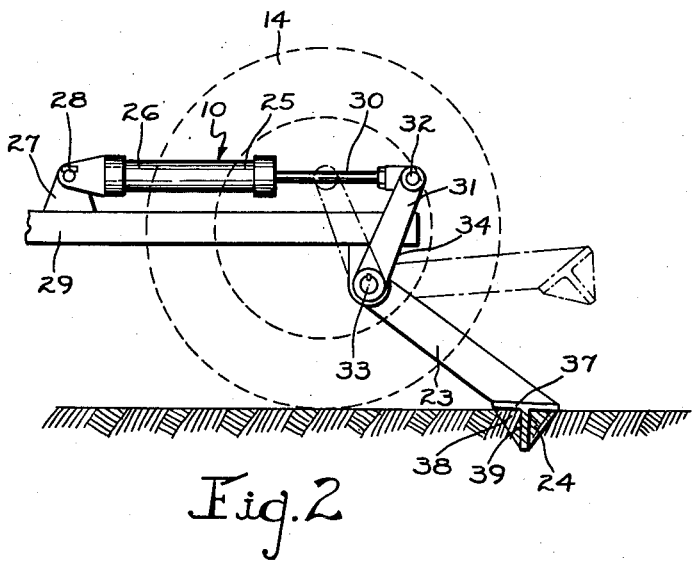

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which:

Figure 1 is a side elevational view of a tractor and digging attachment making use of the present invention, and Figure 2 is an enlarged view of a portion of the apparatus shown in Figure 1.

Referring first to Figure 1, wherein is best shown the overall aspects of the invention, the stabilizing apparatus, indicated generally by the reference number 10, is shown in use with a vehicle such as a tractor 11 and a digging attachment 12. The tractor is of the usual type having large rear wheels 13 and somewhat smaller front wheels 14. The digging attachment 12 is hydraulically-actuated and consists of a dipper 15 fastened to the lower end of a dipper stick 16; the dipper stick is pivoted in its intermediate portion to the rearward end of a boom 17, the forward end of which is pivotally attached to a supporting member 18 fastened to the rear end of the tractor 11. A double-acting hydraulic motor 19 extends between the supporting member 18 and the upper end of the dipper stick 16, and another double-acting hydraulic motor 20 extends between the supporting member 18 and the intermediate portion of the boom 17. A stabilizer 21 extends downwardly from the supporting member and is actuated by a double-acting hydraulic motor 22. Suitable provision, not shown, is made to supply and control the hydraulic fluid for the operation of the motors 19, 20 and 22 in the usual way.

The stabilizing apparatus 10 is attached to the front end of the tractor 11 and, during operation of the digging attachment, is in such a condition that an anchor arm 23 having a spade 24 at its free lower end is directly downwardly and forwardly and is held fixed in that position by a double-acting hydraulic motor 25.

In Figure 2 it can be seen that the hydraulic motor 25 consists of a cylinder 26 whose rearward end is fastened to an abutment 27 by means of a pivot pin 28. The abutment is fastened, by welding or otherwise, to a horizontal longitudinal beam 29 forming a part of the chassis of the tractor and extending along one side thereof adjacent a wheel. The piston rod 30 extends from the other end of the cylinder and is pivotally hinged at its forward end to one end of a crank arm 31 by means of a pin 32. The other end of the crank arm 31 is keyed to a horizontal shaft 33 which is rotatably carried in an abutment 34 fastened to and extending downwardly from the beam 29. In the usual case, the shaft 33 will extend from side to side of the vehicle and there will be an abutment at the other side of the vehicle to receive the other end of the shaft. Also keyed to the shaft 33 is the leg 23 which is of substantial length at the free end of which is formed the pad 24. This pad comprises a web 37 which is at a substantial angle to the leg 23 and crossed triangular webs 38 and 39 which lie in planes which extend at a considerable angle to the length of the leg and perpendicular to each other. The apices of the triangular webs 38 and 39 meet at a common point, thus giving the pad a pointed conformation. Means is provided but not shown for introducing hydraulic fluid to one side of the piston in the hydraulic motor 25 while exhausting it from the other side.

The operation of the invention will now be understood in view of the above description. The tractor 11 with its digging attachment 12 is moved to a position where an excavation is to be made. The stabilizer 10 is in the position shown in broken lines in Figure 2. The operator then actuates the hydraulic controls to cause the motor 25 to expand. This moves the crank arm 31 clockwise (in Figure 2) about the shaft 33. The shaft is rotated a like amount and the leg 23 is moved from the dotted position in Figure 2 to the solid-line position. Depending on the terrain, the leg and its pad 36 may be forced through a greater or lesser amount of earth before reaching its operating position. The hydraulic fluid is locked in the motor 25, thus forming a rigid structure, with the leg 23 extending at an angle in the order of 135 degrees to the beam 29 and to the horizontal. The operator then begins to use the digging attachment; the first "crowding" stroke of the dipper stick and dipper causes the tractor to move toward the excavation slightly. This movement causes the leg and pad to plow even deeper into the earth and effectively resist further movement, which is the desired function of the invention. As shown in exaggerated position in Figure 1, the weight of the tractor and digging attachment during a downward digging stroke is supported at one end on the shovel and at the other end on the pad of the present invention. Since the pad is a considerable distance ahead of the contact point of the front wheels, the proportion of weight that is carried by the shovel is considerably greater than when the front end of the apparatus is supported on the wheels. Also, the base of the apparatus is broadened, giving greater stability.

It is to be understood that the invention contemplates that more than one hydraulic motor and crank arm may be used to rotate the shaft 33 and that more than one leg may be keyed to the shaft. Preferably, there should be a leg and its pad on either side of the vehicle adjacent each front wheel.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

The invention having been thus described, what is claimed as new and desired to secure by Letters Patent is:

1. A stabilizing apparatus for use with a vehicle having a hydraulic digging attachment operatively connected to the rear end thereof, the attachment comprising a boom pivotally connected at one end to the vehicle and a dipper stick pivotally connected to the other end of the boom, a leg pivotally connected at one end to the front end of the vehicle and opposite the end to which the attachment is connected, a pad having a dependent web formed on the other end of the leg, and a hydraulic motor consisting of a cylinder and piston connected between the vehicle and the leg for moving the leg from a retracted position away from the ground to a downwardly- and forwardly-extending operative position contacting the ground at a point substantially forward of the point of normal contact of the front wheel with the ground, the attachment tending to move the vehicle rearwardly along the ground during operation and the stabilizing apparatus resisting such movement when in the said operative position.

2. A stabilizing apparatus for use with a vehicle having a hydraulic digging attachment operatively connected to the rear end thereof, the attachment comprising a boom pivotally connected at one end to the vehicle and a dipper stick pivotally connected to the other end of the boom, a shaft rotatably mounted on the front end of the vehicle, a leg keyed at one end to the shaft, a pad having a pressure receiving web formed on the other end of the leg, the web being arranged at a substantial angle to the leg, a hydraulic motor consisting of a cylinder and piston connected at one end to the vehicle, and a crank arm keyed at one end to the shaft and attached at the other end to the other end of the hydraulic motor for moving the leg from a retracted position away from the ground to a downwardly- and forwardly-extending operative position contacting the ground at a point substantially forward of the point of normal contact of the front wheel with the ground, the attachment tending to move the vehicle rearwardly along the ground during operation and the stabilizing apparatus resisting such movement when in the said operative position.

References Cited in the file of this patent

UNITED STATES PATENTS

| | | |
|---|---|---|
| 1,350,992 | Downie | Aug. 24, 1920 |
| 1,476,121 | Wagner et al. | Dec. 4, 1923 |
| 1,562,795 | Sauveur | Nov. 24, 1925 |
| 1,719,313 | Scott | July 2, 1929 |
| 1,734,882 | Sayers | Nov. 5, 1929 |
| 2,558,686 | Hubbard | June 26, 1951 |